(12) United States Patent
Krönke et al.

(10) Patent No.: US 8,327,307 B2
(45) Date of Patent: Dec. 4, 2012

(54) METHOD AND SYSTEM FOR ELIMINATING IMPLEMENTATION TIMING IN SYNCHRONIZATION CIRCUITS

(75) Inventors: Christian Krönke, Munich (DE); Ansgar Bambynek, Munich (DE); Jürgen Dirks, Holzkirchen (DE)

(73) Assignee: LSI Corporation, Milpitas, CA (US)

( * ) Notice: Subject to any disclaimer, the term of this patent is extended or adjusted under 35 U.S.C. 154(b) by 79 days.

(21) Appl. No.: 12/953,022

(22) Filed: Nov. 23, 2010

(65) Prior Publication Data

US 2012/0128110 A1    May 24, 2012

(51) Int. Cl.
    *G06F 17/50* (2006.01)
(52) U.S. Cl. .............................. 716/134
(58) Field of Classification Search ............ 716/100, 716/134
    See application file for complete search history.

(56) References Cited

U.S. PATENT DOCUMENTS

| | | | |
|---|---|---|---|
| 5,588,004 A | 12/1996 | Suzuki et al. | |
| 6,385,126 B2 | 5/2002 | Jung et al. | |
| 6,836,166 B2 | 12/2004 | Lin et al. | |
| 6,861,867 B2 * | 3/2005 | West et al. | 326/38 |
| 7,057,419 B2 | 6/2006 | Takeo et al. | |
| 7,996,802 B2 * | 8/2011 | Ikeda et al. | 716/106 |
| 2003/0169070 A1 * | 9/2003 | West et al. | 326/38 |
| 2004/0221249 A1 * | 11/2004 | Lahner et al. | 716/4 |
| 2005/0216247 A1 * | 9/2005 | Ikeda et al. | 703/19 |
| 2005/0273741 A1 * | 12/2005 | Lahner et al. | 716/6 |
| 2010/0242003 A1 * | 9/2010 | Kwok | 716/5 |
| 2011/0204932 A1 * | 8/2011 | Cortadella et al. | 327/145 |
| 2012/0005545 A1 * | 1/2012 | Iwashita | 714/724 |

OTHER PUBLICATIONS

Cummings, C.E., "Clock Domain Crossing (CDC) Design & Verification Techniques Using System Verilog," *Sunburst Design World Class Verilog & SystemVerilog Training* (2008) SNUG, Boston, pp. 1-56.

* cited by examiner

*Primary Examiner* — Suchin Parihar
(74) *Attorney, Agent, or Firm* — Kermit D. Lopez; Luis M. Ortiz; Ortiz & Lopez, PLLC

(57) ABSTRACT

A method and system for eliminating implementation timing with respect to a synchronization circuit. A standard library cell having a pair of clock input pins can be connected with at least two asynchronous clock domains of the synchronization circuit in order to measure a timing signal between the flip-flop latches crossing the asynchronous clock domain. A timing delay with respect to each bit pair of the asynchronous clock domain can be determined utilizing a static analysis approach during a layout phase in order to effectively synchronize the asynchronous clock domain. Each bit pair of the asynchronous clock domain can be checked via a static timing analysis tool in order to thereby improve functional accuracy of the synchronization circuit in a wide range of digital logic designs.

20 Claims, 4 Drawing Sheets

METHOD AND SYSTEM FOR ELIMINATING IMPLEMENTATION TIMING IN SYNCHRONIZATION CIRCUITS

TECHNICAL FIELD

Embodiments are generally related to synchronous integrated circuits. Embodiments also relate to gray code counters. Embodiments are additionally related to the elimination of implementation timing in a synchronization circuit.

BACKGROUND OF THE INVENTION

Synchronous sequential circuits or synchronization circuits are integrated logic circuits in which changes in a system state and an output signal are directly initiated by a discrete docking signal. Synchronization circuits can be employed in a wide variety of digital logic designs such as, for example, programmable controllers, microprocessors, and other digital applications. Such integrated circuits typically receive an input signal from an external device and execute one or more processing operations in order to generate an output signal. A clock signal controls the flow of the input signal with respect to the synchronization circuit. A delay-timing signal such as, for example, cell delay timing and wire delay timing with respect to the synchronization circuit, may affect the functionality of the digital logic designs.

A gray code counter can be adapted in the context of digital logic designs in order to produce a single bit transition within a specific window and generate a virtually error free counter signal. A gray code counter provides a relatively simple decoding operation with a decoded output. FIG. 1 illustrates a timing model of a prior art n-bit gray counter circuit 100. The circuit 100 depicted in FIG. 1 generally includes a set of source flip-flops 120, a set of destination flip-flops 140 that are operatively configured with a gray encoder 110 and a gray decoder 150. A source clock ($C_s$) drives the source flip-flops 120 in order to generate a gray code signal in the circuit 100. The gray code signal can be placed into a block and/or die such as a gray code block 130 of the circuit 100. Similarly, a destination clock ($C_d$) drives the destination flip-flops 140.

A clock insertion tool capable of inserting the trees into the circuit 100 can be adapted to permit the data bits of the gray code signals at the destination flip-flops 140 within a certain timing window. The timing window with respect to different data bits between the source flip-flops 120 and the destination flip-flops 140 can be provided by a difference of travel time between the outputs of the source flip-flops 120 and the inputs of the destination flip-flops 140. The flip-flops 120 and 140 must be positioned together and the timing signals in the circuit are to be routed with a special attribute in a layout phase of the circuit design. Additionally, an invalid transition in the gray counter circuit 100 may cause an invalid state transition (e.g., an out of order state) with respect to the digital logic design. Table 1 shown below represents the transitions between a three-bit binary code sequences to a three-bit gray code utilizing the gray code counter 100.

TABLE 1

| Binary Code | | | Gray Code | | |
|---|---|---|---|---|---|
| 0 | 0 | 0 | 0 | 0 | 0 |
| 0 | 0 | 1 | 0 | 0 | 1 |
| 0 | 1 | 0 | 0 | 1 | 1 |
| 0 | 1 | 1 | 0↓$_{T1}$ | 1 | 1 |
| 1 | 0 | 0 | 1 | 1 | 0↓$_{T2}$ |
| 1 | 0 | 1 | 1 | 1 | 1 |
| 1 | 1 | 0 | 1 | 0 | 1 |
| 1 | 1 | 1 | 1 | 0 | 0 |

Valid Operation:
010 => 110, 110 => 111
010 => 111
Invalid Operation:
010 => 011 (T2 before T1)

For example, if the transition 'T2' occurs before a transition event 'T1', then the gray code counter may enter an invalid transition state (e.g., a '011' state) for at least one destination clock cycle. The transitions in the synchronization circuit 100 must be produced in a limited timing window in order to effectively synchronize the asynchronous clock domains. Additionally, such prior art approach for implementing the flip-flops in the synchronization circuit can be a time consuming process and requires additional verification with respect to the timing window.

Based on the foregoing, it is believed that a need exists for an improved system and method for eliminating implementation timing with respect to a synchronization circuit, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved synchronous integrated circuit.

It is another aspect of the disclosed embodiments to provide for an improved method and system for eliminating implementation timing with respect to the synchronization circuit.

It is a further aspect of the disclosed embodiments to provide for an improved method for synchronizing an asynchronous dock domain with respect to the synchronization circuit.

The aforementioned aspects and other objectives and advantages can now be achieved as described herein. A system and method for eliminating implementation timing with respect to a synchronization circuit is disclosed herein. A standard library cell (e.g., a double flip-flop element) having a pair of dock input pins can be connected with at least two asynchronous dock domains of the synchronization circuit (e.g., a n-bit gray counter circuit) in order to measure a timing signal between the flip-flop latches crossing the asynchronous clock domain. A timing delay (e.g., a cell delay and a wire delay) with respect to each bit pair of the asynchronous dock domain can be determined utilizing a static analysis approach during a layout phase in order to effectively synchronize the asynchronous dock domain. Each bit pair of the asynchronous dock domain can be checked via a static timing analysis (STA) tool in order to improve functional accuracy of the synchronization circuit in a wide range of digital logic designs.

The synchronization circuit can perform FIFO (First In, First Out) pointer synchronization between the asynchronous clock domains. The static analysis approach can be adapted to define a timing check for each bit pair in the asynchronous bus structure, The bussed clock domains that are crossing the synchronization circuit can be permitted to be independent from the implementation aspects by connecting the standard library cell to the asynchronous clock domains. The standard library cell can be implemented in all bit lanes of the asynchronous clock domain in order to control the timing parameter of the synchronization circuit. The standard library cell can be a part of an ASIC (Application Specific Integrated Circuit) standard cell library and/or specially designed in a target technology. Such an approach potentially solves the implementation timing issues and static timing analysis iterations by eliminating the design complexity in the synchronization circuit.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
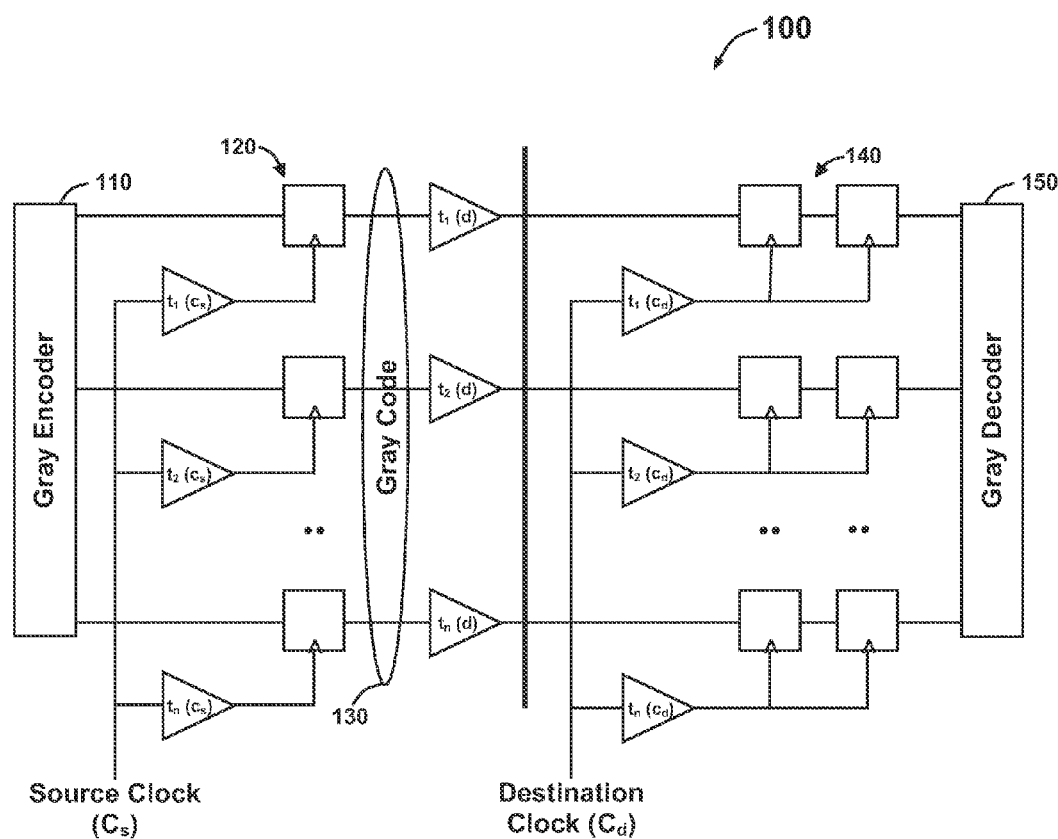
FIG. 1 illustrates a timing model of a prior art n-bit gray counter circuit.
Figure 2:
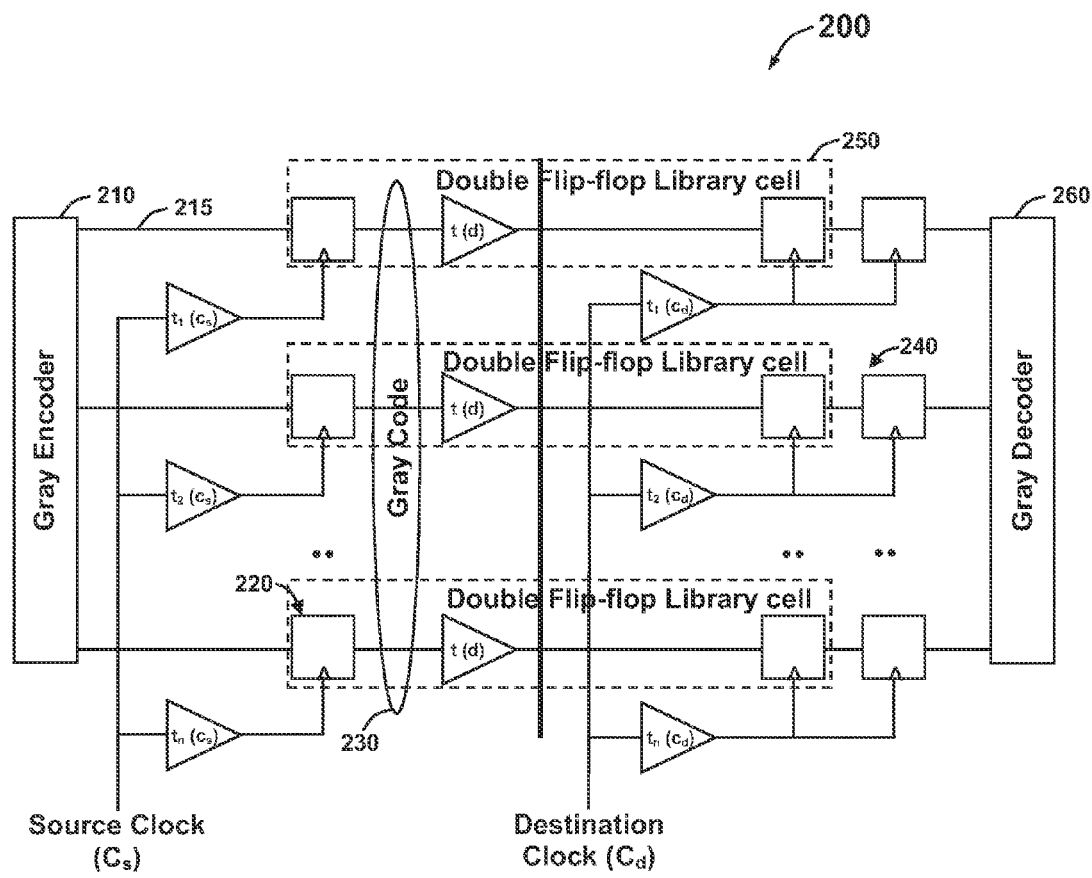
FIG. 2 illustrates a timing model of a gray counter circuit implemented with a double flip-flop library element, in accordance with the disclosed embodiments.

FIG. 2 illustrates a timing model of a gray counter circuit 200 implemented with a double flip-flop library primitive element 250, in accordance with the disclosed embodiments. The gray counter circuit 200 can be implemented as an integrated synchronization circuit, which can be utilized in a wide range of digital logic designs in order to synchronize a clock distribution within the design. The gray counter circuit 200, along with the double flip-flop library element 250, effectively eliminates the implementation timing in the digital logic design. The gray code counter 200 functions as a binary counter in which a set of sequential numbers is represented by the binary expressions, each of which differs from the preceding expression by one bit in a single timing window. The gray counter circuit 200 generally includes a set of source flip-flops 220, a set of destination flip-flops 240 that are operatively configured with a gray encoder 210, and a gray decoder 260.

A source clock ($C_s$) drives the source flip-flops 220 in order to generate a timing signal in the circuit 200. The timing signal can be placed into a block and/or die such as, for example, a gray code block 230 of the circuit 200. Similarly, a destination clock ($C_d$) drives the destination flip-flops 240. The double flip-flop library element 250 measures a timing signal between the source and destination flip-flops 220 and 240 crossing two or more asynchronous clock domains such as a source clock domain ($C_s$) and a destination clock domain ($C_d$). Note that the double flip-flop library element 250 disclosed herein can be a standard library cell.

The gray code counter 200 performs FIFO (First In, First Out) pointer synchronization between the asynchronous clock domains in the logic design. The circuit 200 further determines a timing delay such as a cell delay and a wire delay with respect to each bit pair 215 of the asynchronous clock domains utilizing a static analysis approach that is applied during a layout phase in order to effectively synchronize the asynchronous clock domains. Note that the static timing analysis approach for multi-clock domain designs provide a reliable and accurate static timing analysis data for complex multi-clock designs and minimize the liming issues in the digital designs prior to taping out the designs. Each bit pair 215 of the asynchronous dock domains are further checked via a static timing analysis (STA) tool in order to improve functional accuracy in the digital logic design. The static timing analysis tool can be widely employed to predict the performance of digital designs. The static timing analysis tool typically computes the best and worst rising and falling timing sequences for each signal in the circuit 200. Such timing sequences with respect to the circuit 200 are typically determined in a single pass through a topologically sorted circuit.

The timing check with respect to the asynchronous bus domains can be defined for each bit pair 215 of the circuit 200. The static timing check with respect to each bit pair 215 can be represented as follows:

$$\binom{n}{2} \tag{1}$$

wherein the timing checks with respect to the asynchronous clock domains in the circuit 200 depends on the implementation aspects. The timing characteristics of the gray counter circuit 200 can be generally defined as follows:

$$\forall\ i,j: 0 \leq i,j < n, |t_i(C_s)+t_i(d)-(t_j(C_s)+t_j(d))+t_j(C_d)-t_i(C_d))| < \text{period}(C_s) \tag{2}$$

wherein $t_i(C_s)$ represents the clock tree insertion delay with respect to the source clock domain '$C_s$' in a register bit 'i', $t_i(C_d)$ represents the clock tree insertion delay with respect to the destination clock domain '$C_d$' in the register bit 'i', and $t_i(d)$ represents the delay from the source clock domain '$C_s$' to the destination clock domain '$C_d$' in the register bit 'i'. Such timing characters with respect to the gray counter circuit 200 can be checked utilizing the static timing analysis tool in order to assure proper operation of the counter circuit 200. The timing parameter '$t_i(d)$' in equation (2) is difficult to observe during the static timing analysis. It is, therefore, the timing arcs between the asynchronous dock domains ($C_s$) and ($C_d$) in the circuit 200 that can be excluded and the skew of the dock domain network '$C_s$' can be represented as follows:

$$\text{skew}(C_s) = \max(t_i(C_s)) - \min(t_j(C_s)) \quad (3)$$

On solving equation (3), the timing characteristics of the gray counter circuit 200 can be simplified as follows:

$$\forall\, i,j: 0 \leq i,j < n, |\text{skew}(C_s) + t_i(d) - t_j(d)) + \text{skew}(C_d)| < \text{period}(C_s) \quad (4)$$

The parameter '$t_i(d)$' can be controlled utilizing the double flip-flop primitive element 250 at the bit lanes 215 of the circuit 200. The impact of the implementation process on the parameter '$t_i(d)$' can be therefore replaced by the common cell parameter '$t(d)$' with respect to the bit lanes 215 of the circuit 200, as follows:

$$|\text{skew}(C_s) + \text{skew}(C_d)| < \text{period}(C_s) \quad (5)$$

Performing the static timing analysis within a reasonable time period can effectively eliminate the timing checks with respect to the bit lanes 215 in the gray counter circuit 200. The gray counter 200 can be provided with the capability of processing multiple digit expressions with a single bit transition at a specific window in a simplified and facile manner. The number of logic equations and the corresponding logic circuit components which are used for implementing the logic functions of the gray code counter circuitry 200 can be reduced in order to form denser, faster, and low power consuming integrated digital circuits in a wide range of digital logic designs.

Figure 3:
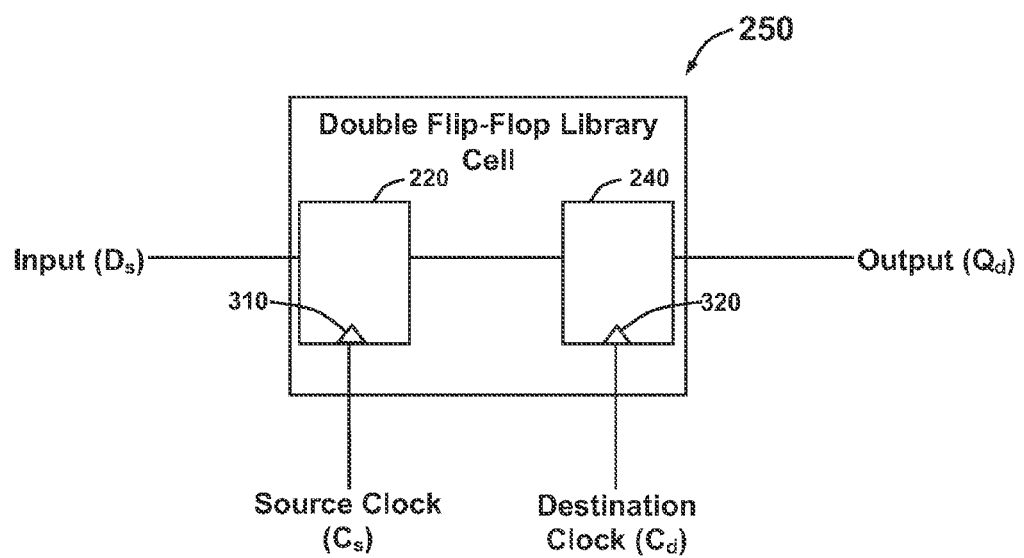
FIG. 3 illustrates a circuit diagram of the double flip-flop library element, in accordance with the disclosed embodiments.

FIG. 3 illustrates a circuit diagram of the double flip-flop library element 250, in accordance with the disclosed embodiments. Note that in FIGS. 1-4, identical or similar blocks are generally indicated by identical reference numerals. The double flip-flop library primitive element 250 includes a pair of clock input pins such as clock input pins 310 and 320. The clock input pins 310 and 320 of the library element 250 can be operatively connected to at least two asynchronous clock domains $C_s$ and $C_d$ of the gray counter circuit 200 in order to measure the timing signal between the flip-flop latches 220 and 240 crossing the asynchronous dock domains. The library element 250 further includes an output line $Q_d$, a data input line $D_s$ together with a corresponding first clock input signal line $C_s$, and a second clock input signal line $C_d$.

Note that the library element 250 may optionally include a preset line and/or a clear line in accordance with the design considerations. The double flip-flop library primitive element 250 permits the bussed clock domain crossings to be independent from the implementation aspects. The double flip-flop library primitive element 250 can be implemented in the bit lanes 215 of the asynchronous clock domain in order to control the timing parameter of the gray counter circuit 200. The double flip-flop library primitive element 250 can be a part of an ASIC (Application Specific Integrated Circuit) standard cell library and/or especially designed in a target technology.

The double flip-flop library primitive element 250 can be employed at each bit pair 215 of the gray counter 200 in order to virtually eliminate the glitches experienced in the gray counters 200 while processing modules and/or building blocks of the binary digits forming the expressions of a progression of states and/or numbers. The gray code counter 200 in association with the double flip-flop element 250 affords incrementing and decrementing operations. The double flip-flop primitive element 250 also operates as a synchronous reset element and/or an asynchronous set counter. The gray code counter 200 in association with the double flip-flop library primitive element 250 reduces propagation delays and improves reliability of performance as a result of the reduction in the number of levels of the logic circuitry 200.

Figure 4:
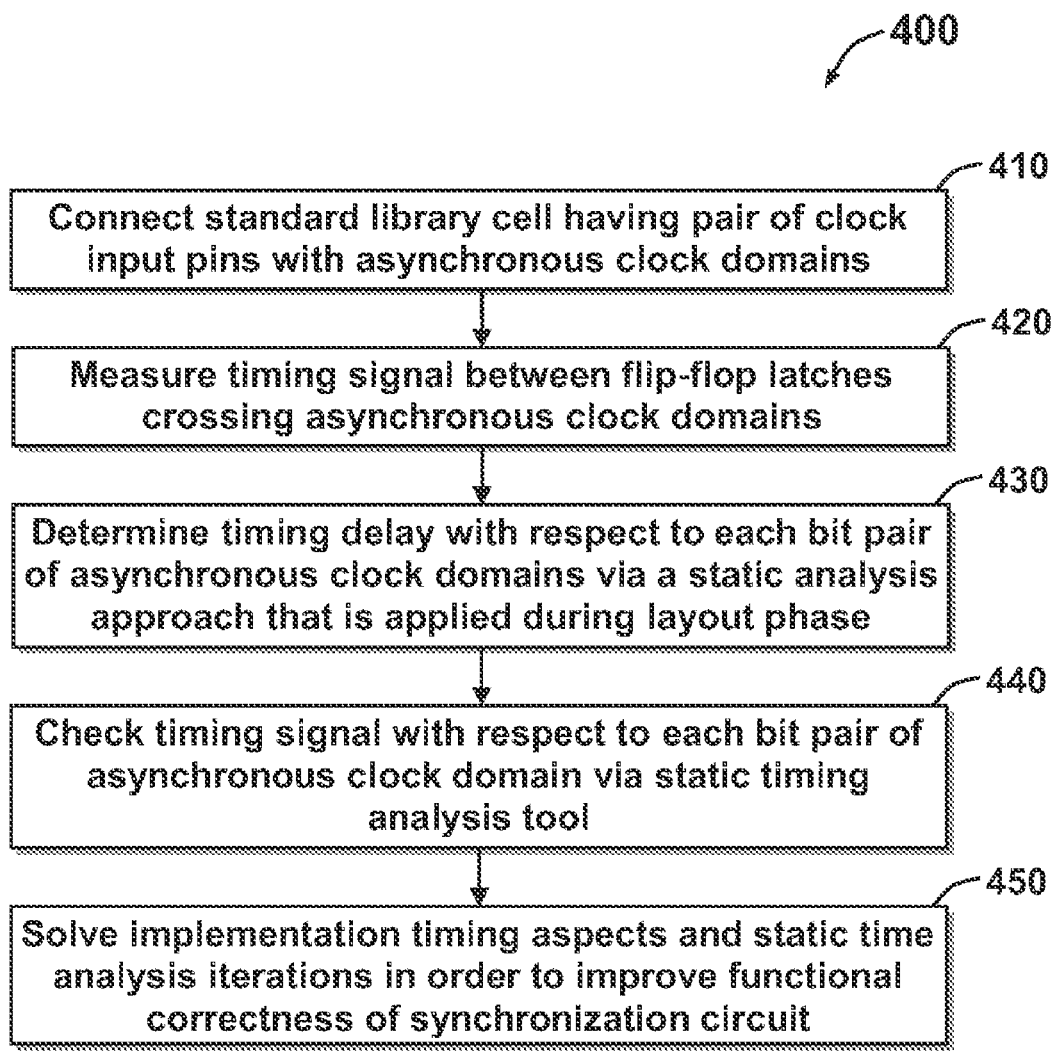
FIG. 4 illustrates a high level flow chart of operation illustrating logical operation steps of a method for eliminating implementation timing in a synchronization circuit, in accordance with the disclosed embodiments.

FIG. 4 illustrates a high level flow chart of operation illustrating logical operational steps of a method 400 for eliminating implementation timing in the gray counter circuit 200, in accordance with the disclosed embodiments. The double flip-flop primitive element 250 having a pair of clock input pins 310 and 320 can be operatively connected with at least two asynchronous clock domains $C_s$ and $C_d$ of the gray counter circuit 200, as illustrated at block 410. The timing signal between the flip-flop latches 220 and 240 crossing the asynchronous clock domains can be further measured in order to determine the implementation timing in the circuit 200, as depicted at block 420. The timing delay with respect to each bit pair 215 of the asynchronous clock domains can be determined utilizing the static analysis approach that is applied during the layout phase in order to effectively synchronize the asynchronous clock domains, as indicated at block 430.

Note that the timing delay in the synchronization circuit 200 can be such as, for example, a cell delay and a wire delay. Thereafter, each bit pair 215 of the asynchronous clock domains can be further checked via the static timing analysis (STA) tool in order to assure proper operation of the gray counter circuit 200, as illustrated at block 440. The implementation timing aspects and the static timing analysis iterations in the gray counter circuit 200 can be solved in order to improve the functional accuracy in the digital logic designs, as indicated at block 450. Such a system and method potentially solves the implementation timing issues and static timing analysis iterations by eliminating the design complexity in the synchronization circuit structures.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for eliminating implementation timing in a synchronization circuit, said method comprising:
   connecting a standard library cell having a pair of clock input pins with at least two asynchronous clock domains associated with a synchronization circuit to measure a timing signal between at least one flip-flop latch crossing said at least two asynchronous clock domains;
   determining a timing delay with respect to each bit pair of said at least two asynchronous clock domains utilizing a static analysis approach during a layout phase in order to effectively synchronize said at least two asynchronous clock domains in said synchronization circuit; and
   verifying said timing signal at each bit pair of said at least two asynchronous clock domains via a static timing analysis tool in order to improve a functional accuracy of said synchronization circuit in a wide range of digital logic designs.

2. The method of claim 1 further comprising performing a first in first out pointer synchronization between said at least two asynchronous clock domains of said synchronization circuit.

3. The method of claim 1 further comprising defining a timing check with respect to each bit pair in said at least two asynchronous clock domains via said static analysis approach.

4. The method of claim 1 further comprising designing said asynchronous clock domains to be independent from said synchronization circuit implementation utilizing said standard library cell.

5. The method of claim 1 further comprising implementing said standard library cell with respect to said bit pair of said at least two asynchronous clock domains in order to control said timing parameter of said synchronization circuit.

6. The method of claim 1 wherein said standard library cell comprises an ASIC standard cell library.

7. The method of claim 1 wherein said standard library cell comprises a specific double flip-flop primitive library element.

8. The method of claim 1 wherein said synchronization circuit comprises a gray code counter.

9. The method of claim 1 wherein said timing delay comprises at least one of the following types of signals:
a cell delay timing signal; and
a wire delay timing signal.

10. A system for eliminating implementation timing in a synchronization circuit, said system comprising:
a processor;
a data bus coupled to said processor; and
a non-transitory computer readable storage medium embodying computer code, said non-transitory computer readable storage medium being coupled to said data bus, said computer program code comprising instructions executable by said processor and configured for:
connecting a standard library cell having a pair of clock input pins with at least two asynchronous clock domains associated with a synchronization circuit to measure a timing signal between at least one flip-flop latch crossing said at least two asynchronous clock domains;
determining a timing delay with respect to each bit pair of said at least two asynchronous clock domains utilizing a static analysis approach during a layout phase in order to effectively synchronize said at least two asynchronous clock domains in said synchronization circuit; and
verifying said timing signal at each bit pair of said at least two asynchronous clock domains via a static timing analysis tool in order to improve a functional accuracy of said synchronization circuit in a wide range of digital logic designs.

11. The system of claim 10 wherein said instructions are further configured for performing a first in first out pointer synchronization between said at least two asynchronous clock domains of said synchronization circuit.

12. The system of claim 10 wherein said instructions are further configured for defining a timing check with respect to each bit pair in said at least two asynchronous clock domains via said static analysis approach.

13. The system of claim 10 wherein said instructions are further configured for designing said asynchronous clock domains to be independent from said synchronization circuit implementation utilizing said standard library cell.

14. The system of claim 10 wherein said instructions are further configured for implementing said standard library cell with respect to said bit pair of said at least two asynchronous clock domains in order to control said timing parameter of said synchronization circuit.

15. The system of claim 10 wherein said standard library cell comprises an ASIC standard cell library.

16. The system of claim 10 wherein said standard library cell comprises a specific double flip-flop primitive library element.

17. The system of claim 10 wherein said synchronization circuit comprises a gray code counter.

18. The system of claim 10 wherein said timing delay comprises at least one of the following types of signals:
a cell delay timing signal; and
a wire delay timing signal.

19. A system for eliminating implementation timing in a synchronization circuit, said system comprising:
a processor;
a data bus coupled to said processor; and
a non-transitory computer readable storage medium embodying computer code, said non-transitory computer readable storage. medium being coupled to said data bus, said computer program code comprising instructions executable by said processor and configured for:
connecting a standard library cell having a pair of clock input pins with at least two asynchronous clock domains associated with a synchronization circuit to measure a timing signal between at least one flip-flop latch crossing said at least two asynchronous clock domains;
determining a timing delay with respect to each bit pair of said at least two asynchronous clock domains utilizing a static analysis approach during a layout phase in order to effectively synchronize said at least two asynchronous clock domains in said synchronization circuit;
verifying said timing signal at each bit pair of said at least two asynchronous clock domains via a static timing analysis tool in order to improve a functional accuracy of said synchronization circuit in a wide range of digital logic designs; and
performing a first in first out pointer synchronization between said at least two asynchronous clock domains of said synchronization circuit.

20. The system of claim 19 wherein:
said synchronization circuit comprises a gray code counter;
said timing delay comprises at least one of the following types of signals:
a cell delay timing signal; and
a wire delay timing signal.

* * * * *